United States Patent

[11] 3,619,774

| [72] | Inventor | Franz Josef Landwehr |
| | | Munster, Germany |
| [21] | Appl. No. | 845,738 |
| [22] | Filed | July 29, 1969 |
| [45] | Patented | Nov. 9, 1971 |
| [73] | Assignee | Wandel & Goltermann |
| | | Reutlingen, Germany |
| [32] | Priority | July 30, 1968 |
| [33] | | Austria |
| [31] | | A 7430/68 |

[54] SYSTEM FOR MEASURING NONLINEARITY OF A SIGNAL-TRANSMITTING NETWORK
8 Claims, 6 Drawing Figs.

[52] U.S. Cl. ........................................ 324/57 DE,
324/57 N
[51] Int. Cl. ........................................ G01r 27/00
[50] Field of Search ........................................ 324/57, 57
DE, 57 N; 330/2

[56] References Cited
UNITED STATES PATENTS
2,632,792 3/1953 Selz ............................ 324/57 DE
2,901,696 8/1959 Mollfors ........................ 324/57 N
3,519,945 7/1970 Lawson et al. .................. 330/2

Primary Examiner—Alfred E. Smith
Attorney—Karl F. Ross

ABSTRACT: The output of a random-noise generator is modulated with the aid of two fixed reference frequencies $G_1$, $G_2$ (one of which may be zero) to yield two mutually transposed but correlated noise bands overlapping in a frequency range which substantially coincides with a band of signal frequencies to be transmitted through a test circuit to be examined for nonlinearity. With the sum or difference of any two correlated signal frequencies $f_i'$, $f_i''$ in the two noise bands equal to a fixed beat frequency $F=G_2\pm G_1$, the amplitude of a signal of this beat frequency in the output of the test circuit receiving the two wholly or partly coincident noise bands is a measure of the nonlinearity of that test circuit throughout the signal band. A broadband of signal frequencies may be substituted for the noise frequencies if the system is to be tested in actual operation.

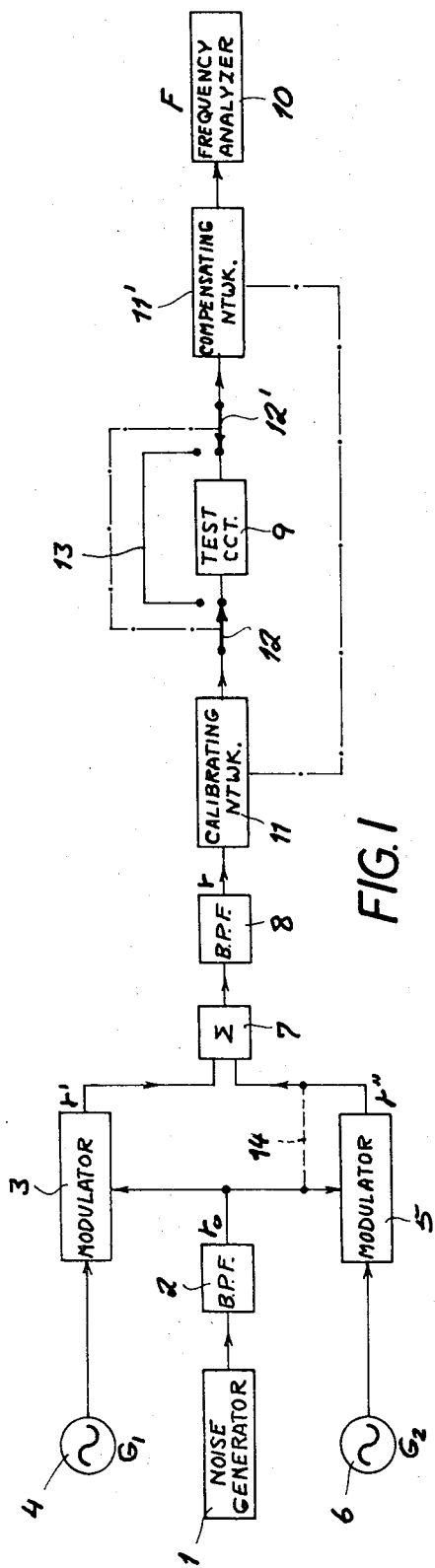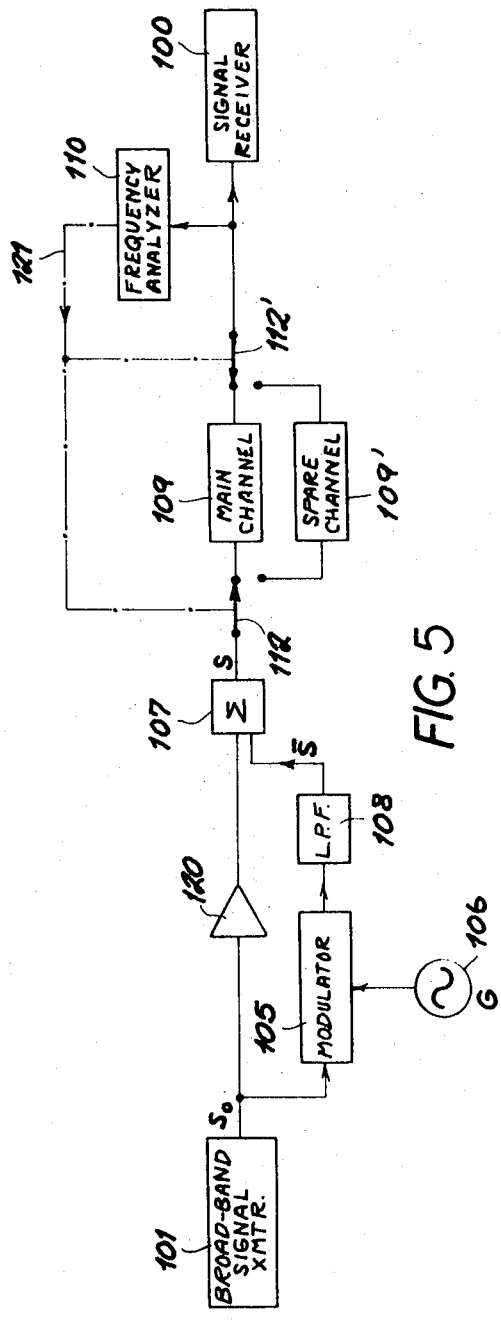

INVENTOR:
Franz J. Landwehr
BY
Karl J. Ross
Attorney

SYSTEM FOR MEASURING NONLINEARITY OF A SIGNAL-TRANSMITTING NETWORK

My present invention relates to a system for measuring the nonlinearity of a signal-transmitting network or other test circuit designed to pass a predetermined frequency band.

The linearity of transmission of such circuits e.g., cables, radio beams, amplifiers, speakers, waveguides and the like) is essential in order to prevent signal distortion and, in the case of a multichannel transmission path, to minimize crosstalk. To determine the presence or absence of nonlinearity, therefore, various systems have been developed. Generally the conventional technique comprises the concurrent transmission of two sine waves through the test circuit so that any nonlinearity present therein gives rise to intermodulation products or beat frequencies whose amplitudes are a measure of the degree of nonlinearity present in a particular region of the signal band. Even if several harmonics of a first sine wave are thus interacted with a second sine wave so that several beat frequencies fall within the signal band, this system enables exploration of only isolated regions of that band.

It has also been proposed to transmit a spectrum of random frequencies, sometimes referred to as "white noise," through such a test circuit and to measure the distortions, if any, of these frequencies throughout the signal band. A drawback of this method is that the background noise originating within the system itself is superimposed upon the transmitted random frequency pattern so as to falsify the results of the measurements made. Since the entire frequency spectrum must be evaluated, it is not possible to reduce the noise level by selective filtering, as can be done with the technique first described.

The general object of my invention, therefore, is to provide an improved system for ascertaining nonlinearities which, in a single test, determines the performance of the transmission path throughout its band of signal frequencies with effective suppression of interfering background noise.

A more particular object is to provide a system of this character which can be used during the transmission of message signals through the circuit under test.

In accordance with this invention I provide a source of random frequencies, such as a generator of "white noise," spread over a predetermined test band whose width equals or exceeds that of a band of signal frequencies to be transmitted through a test circuit. The output of this source is fed to a modulating stage which includes a supply of at least one fixed reference frequency and which derives from the original test band a pair of two mutually transposed but at least partly overlapping correlated test bands, the region of overlap coinciding substantially with the signal band of the test circuit. Owing to the mode of generation of these correlated test bands, any given frequency in one test band has a counterpart in the other test band which, when additively or subtractively combined with the first frequency, yields a fixed beat frequency related to the reference frequency or frequencies supplied by the modulating stage. With two such reference frequencies, the beat frequency equals either the sum or the difference of these reference frequencies; if one reference frequency is suppressed (i.e., is made equal to zero), the beat frequency is identical with the remaining reference frequency.

Since this correlation of paired frequencies within the two mutually transposed test bands is true for all frequencies throughout the signal band, the magnitude of the beat frequency in the output of the test circuit is a cumulative measure of the nonlinearities existing within that band. Virtually all spurious frequencies due to inherent noise, including the products of intermodulation of noncorrelated components of the test bands, can be suppressed by selective filtering of this beat frequency.

If the invention is to be utilized in a system in which a broadband signal source is available, the output of the transmitter itself can be used as the source of random test frequencies. In order to prevent objectionable interference with communication, the transposed signal band should then be combined with the original signal band at a relatively reduced amplitude level.

The use of two reference frequencies allows the utilization of a random-frequency source whose output originally lies in a band different from (e.g., above) the signal band of the test circuit. Since, even in voice-frequency communication, the useful signal frequencies generally do not extend to 0 Hz., I may use in such case two reference frequencies lying outside the original test band with close mutual spacing so that their difference frequency lies below the lower limit of the actual signal band though being readily transmissible together with that band. Under these conditions, the two mutually transposed test bands issuing from the modulation stage will be relatively offset so that, in order to provide a region of overlap spanning the entire signal band, the original test band must be somewhat wider than the signal band. With the use of a single reference frequency lying above the original test band, and spaced from the upper limit of that band by a distance (in Hz.) equal to the lower limiting frequency of the band, the transposed band produced by the modulator will be coextensive with the original band but inverted with reference thereto. In this case, the width of each of these bands can be the same as that of the signal band of the test circuit. A similar result can be obtained with the use of two reference frequencies located on opposite sides of the original test band.

The above and other features of my invention will be described in greater detail hereinafter with reference to the accompanying drawing in which:

FIG. 1 is a block diagram of a system embodying my invention;

FIG. 5 is a diagram similar to FIG. 1, illustrating a modification; and

In FIG. 1 I have shown a system for the ascertainment of nonlinearity of a test circuit 9 which may be an impedance network or any other signal-transmission path. This system includes a source of random test frequencies, shown as a noise generator 1, whose output is limited by a band-pass filter 2 to produce a spectrum $r_0$ as shown in graph (a) of FIG. 2. Two local oscillators 4 and 6 generate a pair of reference frequencies $G_1$, $G_2$ which, as shown in the same graph, are separated by a difference frequency G substantially smaller than the width of test band $r_0$; frequency $G_1$ lies just at the upper end of that band whereas frequency $G_2$ has a slightly higher value.

Figure 2:
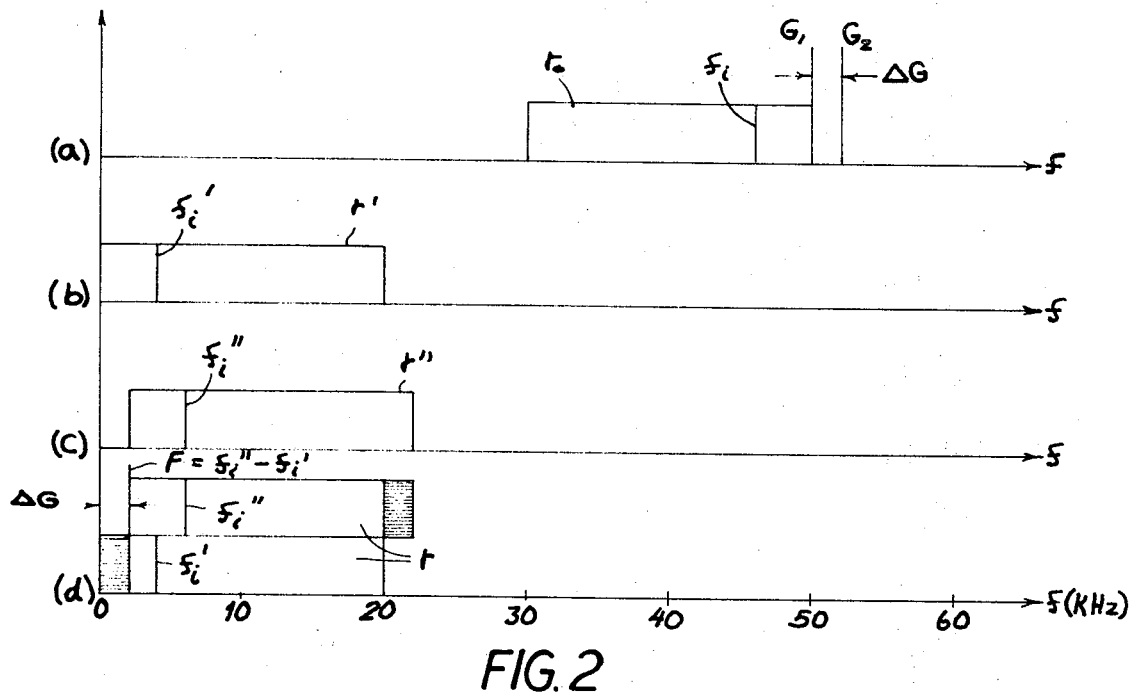
FIGS. 2 and 3 are two sets of graphs relating to the operation of the system of FIG. 1.

Two modulators or mixers 3 and 5 heterodyne the test band $r_0$, issuing from filter 2, with the frequencies $G_1$ and $G_2$, respectively, thereby giving rise to a pair of lower sidebands $r'$, $r''$ which have been illustrated in graphs (b) and (c) of FIG. 2 and which are linearly combined, as illustrated in graph (d) of that Figure, in a summing circuit 7. Another band-pass filter 8 in the output of the latter circuit clips the edges of the combined band to produce a composite test band $r$ which, it will be assumed, is coextensive with a signal band to be transmitted by the test circuit 9.

The amplitude of the test band $r$ cleared by filter 8 can be adjusted with the aid of a calibrating network 11 in the input of test circuit 9, a compensating network 11' being connected in the output thereof. Reference is made to U.S. Pat. Nos. 3,461,385, and 3,486,112, for a calibrating system of this type. Two switches 12 and 12', ganged for concurrent operation, serve to bypass the test object 9 during preliminary adjustment. The output of that test object, as modified in amplitude by the circuit 11', is delivered to a frequency analyzer 10 which may include an oscilloscope showing the entire signal band or a voltmeter in the output of a narrow band filter centered on a beat frequency F illustrated in graph (d) of FIG. 2.

Let us consider an arbitrary frequency $f_i$ forming part of band $r_0$, e.g., a frequency of 46 kHz. in a band ranging from 30 to 50 kHz. Upon modulation with frequency $G_1$ to 50 kHz., this band appears in inverted form in the range of 0 to 20 kHz.; the selected arbitrary frequency is reproduced therein as a frequency $f_i'=G_1-f_i=4$ kHz. Modulation with frequency $G_2=52$ kHz. yields the inverted band $r''$ in the range of 2 to 32 kHz., with the selected frequency $f_i''=G_2-f_i=6$ kHz. With the two frequencies $f_i'$ and $f_i''$ interacting by reason of a nonlinearity in the corresponding region of the pass band of test circuit 9, there results a difference frequency $F=f_i''-f_i'=G_2-G_1$. Thus, the beat frequency F shown in graph (d) of FIG. 2 has a value of 2 kHz. which is independent of the magnitude of $f_i$, this beat frequency therefore combining the energies of the intermodulation products of all pairs of correlated noise frequencies in the bands $r'$ and $r''$.

Figure 3:
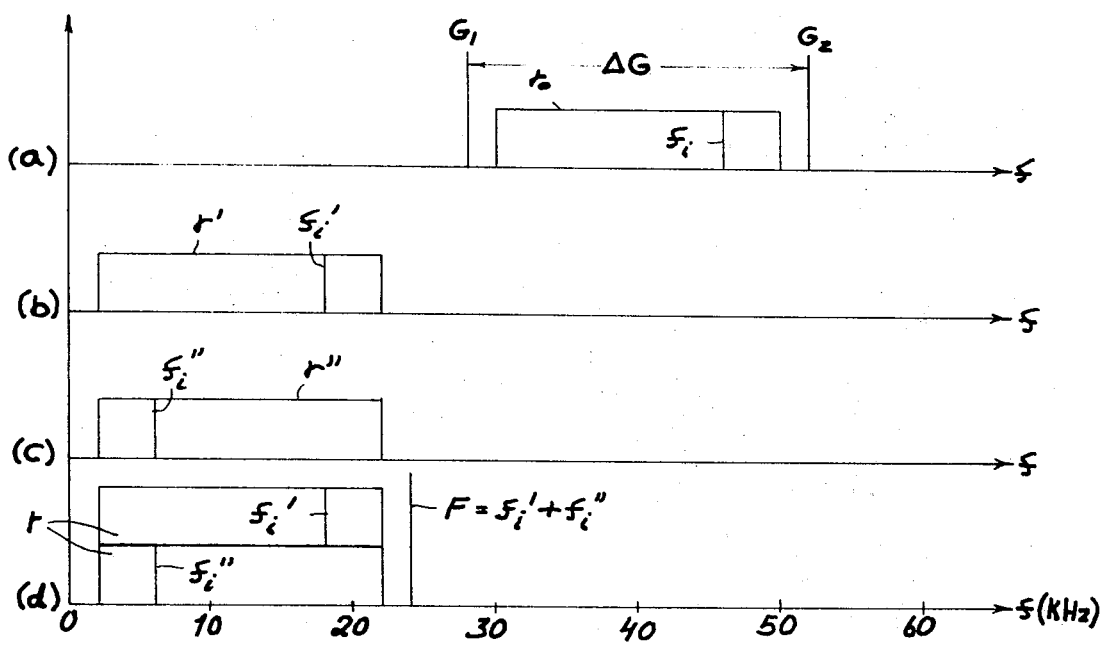

Graph (a) of FIG. 3 shows the two reference frequencies $G_1$ and $G_2$ positioned on opposite sides of the test band $r_o$, specifically at 28 and 52 kHz., respectively. The first transposed test band $r'$, graph (b), then lies in the range of 2 to 22 kHz. without inversion, the frequency $f_i'=f_i-G_1$ being thus located at 18 kHz. The second band $r''$, graph (c) of FIG. 3, has the same position as in FIG. 2, again with $f_i''=G_2-f_i=6$ kHz. The resulting beat frequency F, graph (d), is given by $F=f_i'+f_i''=G_2-G_1=24$ kHz.

In a specific test carried out with a system as shown in FIG. 1, the test object 9 was a voltage divider in the form of an R.C. network with a pass band ranging from 100 Hz. to 50 kHz.; an artificial nonlinearity was introduced by the insertion of a diode. The original test band passed by filter 2 ranged from 0.5 to 25 kHz., with oscillator 4 generating a reference frequency $G_1=1.8$ kHz. Oscillator 6 and modulator 5 were omitted, i.e., $G_2=0$, the output of filter 2 being directly connected to one of the inputs of summing circuit 7 as indicated by the dotted line 14 in FIG. 1. The band of signal frequencies to be transmitted through network 9 extended from 5 to 22 kHz.

Figure 4:
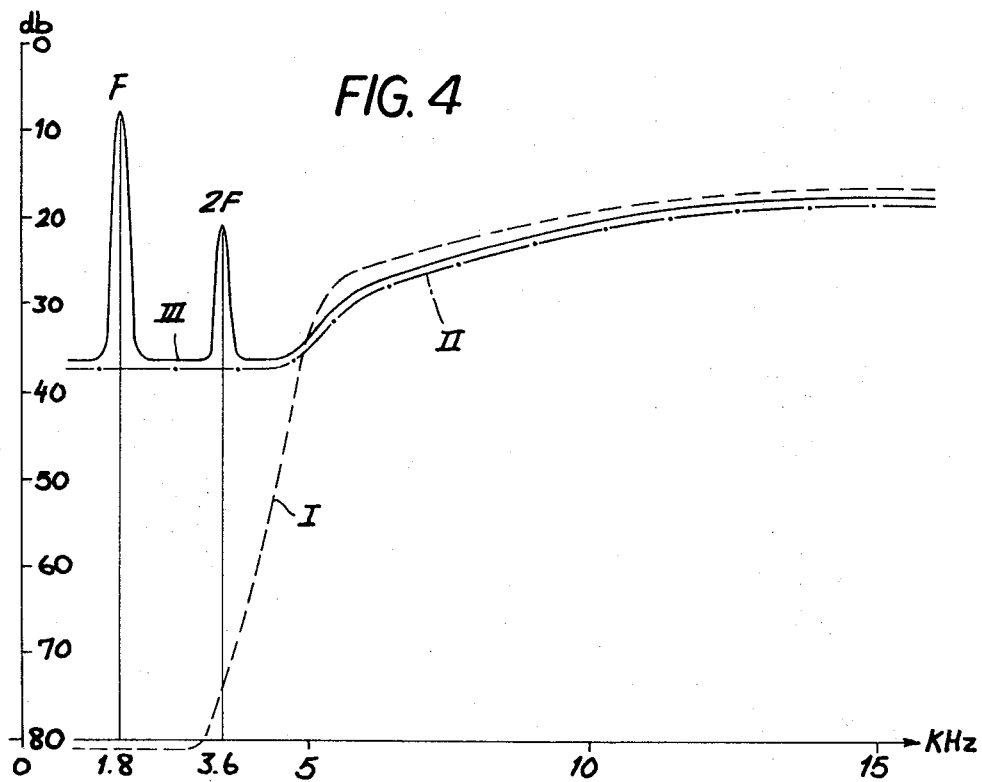
FIG. 4 is a curve diagram showing the performance of a system similar to that of FIG. 1 under various test conditions.

Curve I of FIG. 4 shows the output of filter 8 under the assumed conditions, i.e., with a pass band of 5 to 22 kHz., as obtained from a spectrograph used as the frequency analyzer 10 upon reversal of switches 12 and 12' to bypass the test circuit 9. Curve II of FIG. 4 is the spectrogram obtained from test circuit 9 (with switches 12 and 12' restored) upon the feeding of only the output of filter 2 into this test circuit, with omission of the second noise band $r'$ from modulator 3; the part of curve II to the left of curve I represents the intermodulation products due to nonlinearity and the internally generated background noise. Curve III, finally, illustrates the output of the spectrograph upon a feeding of both test bands $r_o$ and $r'$ into test circuit 9 in accordance with my present invention; a distinct peak appears at frequency $F=G_2=1.8$ kHz., a secondary peak being also visible at $2F=3.6$ kHz. as a result of intermodulation of several pairs of correlated frequencies.

Figure 6:
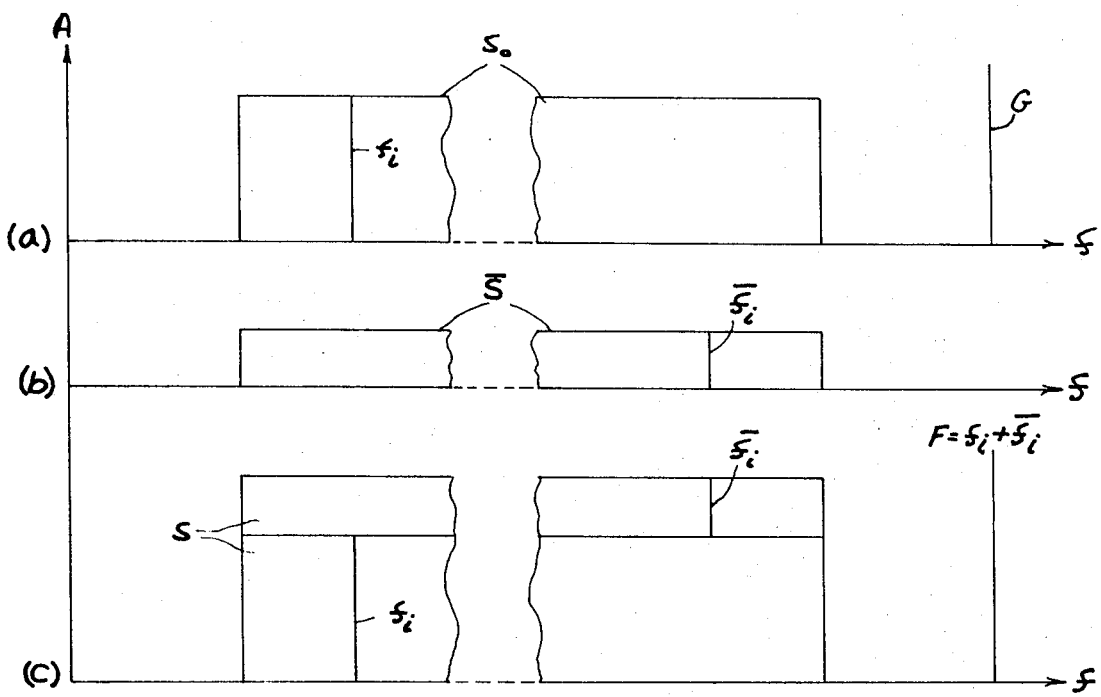
FIG. 6 is a set of graphs related to the system of FIG. 5.

In FIG. 5 I have shown a modified system in which a broadband signal transmitter 101 replaces the noise generator 1 of FIG. 1 as a source of random frequencies spread over a band $s_o$; see also graph (a) of FIG. 6. The band $s_o$ is fed through an amplifier 120 to a summing circuit 107 which also receives the output of a low-pass filter 108 fed by a modulator 105. This modulator heterodynes the signal band $s_o$ from transmitter 101 with a fixed reference frequency G from a local oscillator 106, thereby producing an inverted signal band $\bar{s}$ shown in graph (b) of FIG. 6. With reference frequency G separated from the upper limit of band $s_o$ by a spectral distance equal to the lower limit of that band, the transposed band $\bar{s}$ is coextensive with the original band $s_o$ while having a considerably smaller amplitude A. Graph (c) of FIG. 6 shows the resulting test band $s$, appearing in the output of summing circuit 107, which is fed to a main transmission channel 109, representing the circuit under test, via a switch 112 which is ganged with another switch 112' in the output of that channel. The message signals transmitted via channel 109 are delivered to a receiver 100 and, in parallel therewith, to a frequency analyzer 110 which may be selectively tuned to the beat frequency $F=G$. A connection 121 extending from analyzer 110 controls the switches 112 and 112' to replace the main channel 109 by a spare channel 109' whenever excessive distortion appears in the former, as determined by the nonlinearity test continuously carried out by the analyzer 110. Naturally, this analyzer could also emit an audible or visual alarm signal attracting the attention of an operator in lieu of or in addition to switching the channels.

An arbitrarily selected frequency $f_i$ in band $s_o$ has a counterpart $\bar{f_i}=G-f_i$ in band $\bar{s}$. In this case, $F=f_i+\bar{f_i}=G$.

I claim:

1. A system for determining the nonlinearity of a signal-transmitting circuit, comprising a source of random frequencies spread over a predetermined test band; modulating means including a supply of at least one fixed reference frequency for deriving from the output of said source a pair of two mutually transposed but at least partly overlapping correlated test bands within which any two correlated frequencies, derived from a common frequency in the original test band, give rise to a predetermined beat frequency upon intermodulation thereof in a nonlinear transmission path; summing means for combining said correlated test bands; and frequency-selective indicator means connected to receive said beat frequency from the output of a test circuit connected to said summing means for ascertaining the amplitude of an output signal at said beat frequency as a measure of nonlinearity of said test circuit throughout a signal band substantially coinciding with the region of overlap of said correlated test bands.

2. A system as defined in claim 1 wherein said source includes a random-noise generator and a band-pass filter in the output of said generator, said reference frequency being located beyond the pass band of said filter.

3. A system as defined in claim 2 wherein said modulating means includes a supply of a second fixed reference frequency located beyond the pass band of said filter.

4. A system as defined in claim 3 wherein said modulating means further includes additional filter means in the output of said summing means.

5. A system as defined in claim 4 wherein said additional filter means has a pass band excluding said original test band and said reference frequencies.

6. A system as defined in claim 5 wherein said reference frequencies are located above said original test band with a mutual separation corresponding to a difference frequency near the lower limit of the pass band of said additional filter means.

7. A system as defined in claim 1 wherein said source comprises a broadband signal transmitter, said modulating means including mixer means for heterodyning the output of said transmitter with said reference frequency and for transmitting the resulting frequency band to said summing circuit together with the signals from said transmitter but at a lower amplitude level than said signals.

8. A system as defined in claim 7, further comprising alarm means controlled by said indicator means for interrupting the transmission of said signals through said test circuit in response to an amplitude of said beat frequency exceeding a predetermined level.

* * * * *